Feb. 1, 1966     A. S. ROGERS     3,233,170
MAGNETIC STUCK PIPE LOCATOR AND DETONATOR
USING A SINGLE LINE TO TRANSMIT SIGNALS
Filed March 1, 1961     4 Sheets-Sheet 1
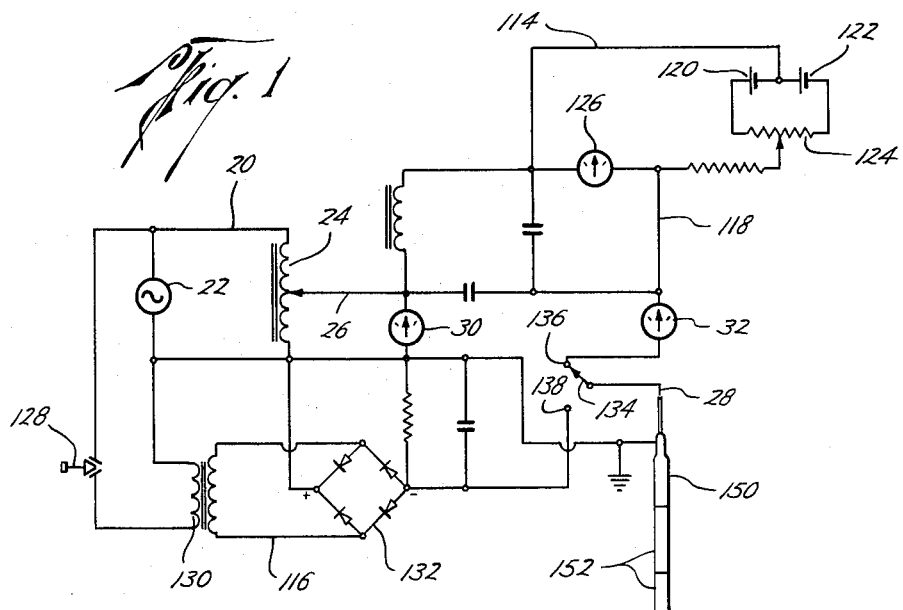
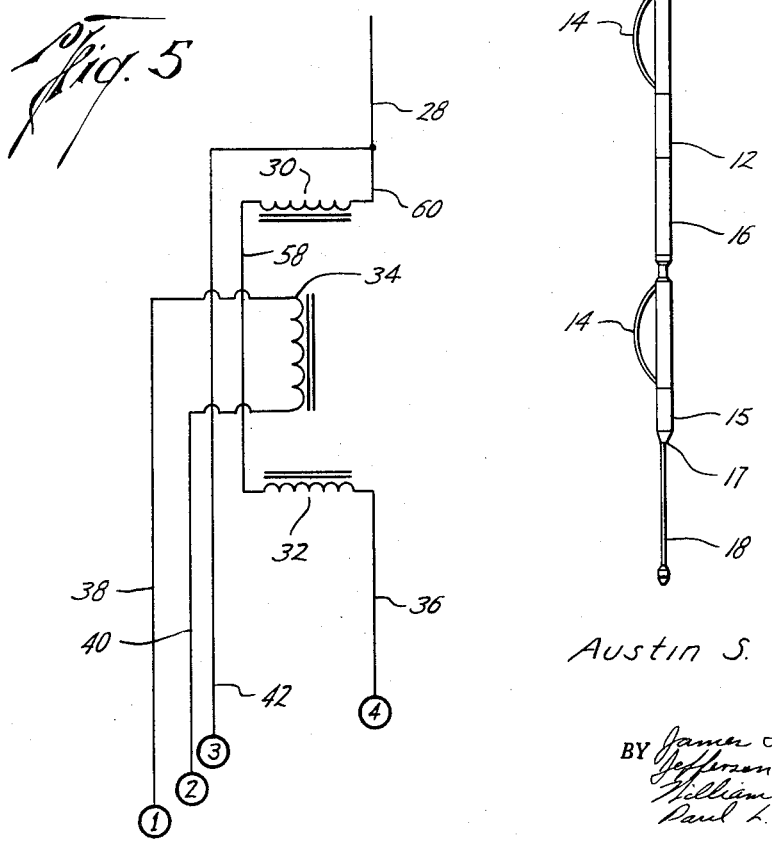
Austin S. Rogers
INVENTOR.
BY James F. Weiler
Jefferson D. Giller
William F. Stout
Paul L. DeVerter II
ATTORNEY

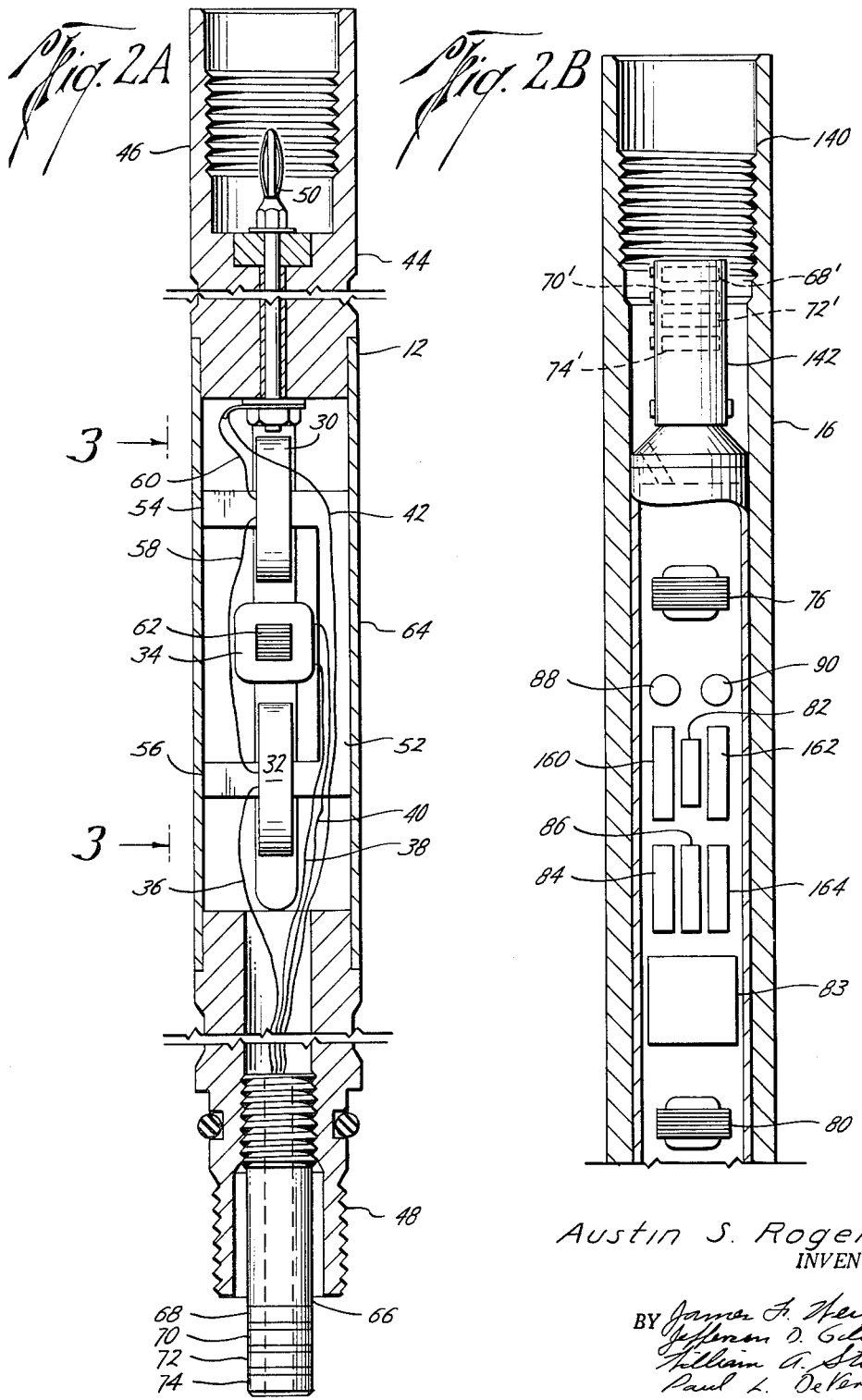

Feb. 1, 1966  A. S. ROGERS  3,233,170
MAGNETIC STUCK PIPE LOCATOR AND DETONATOR
USING A SINGLE LINE TO TRANSMIT SIGNALS
Filed March 1, 1961  4 Sheets-Sheet 3
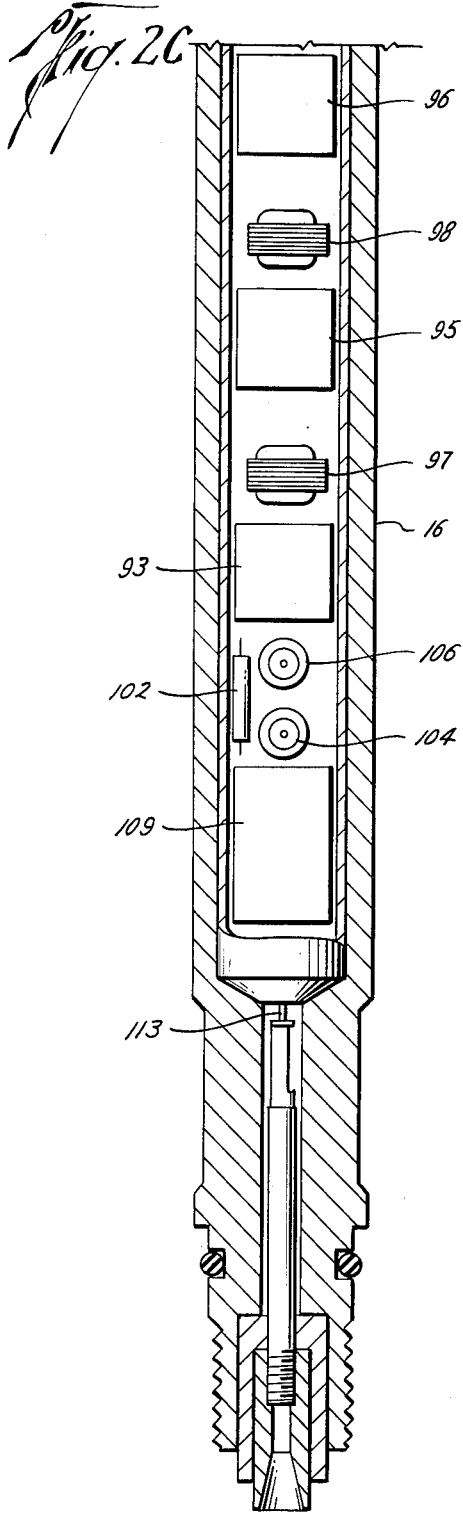
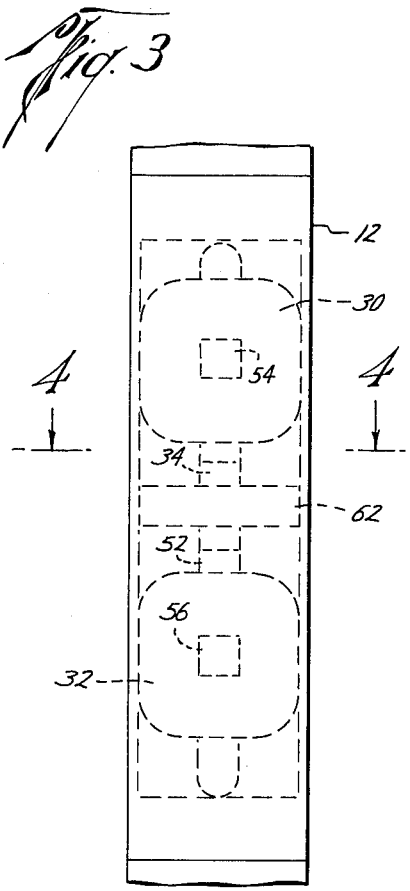
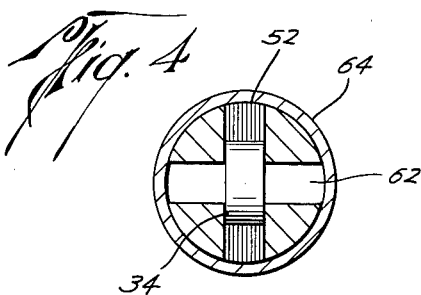
Austin S. Rogers
INVENTOR.
BY
ATTORNEY

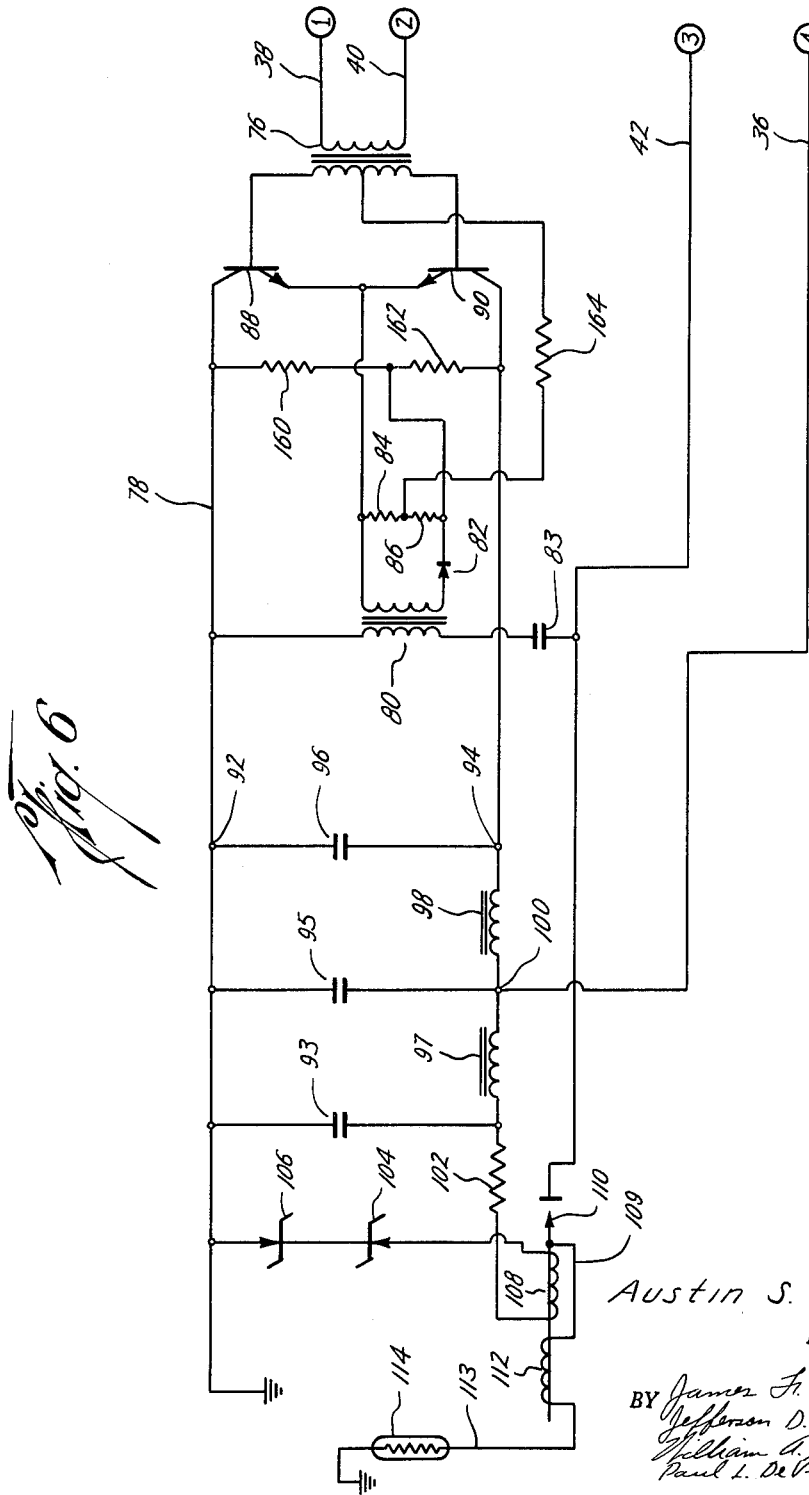

United States Patent Office 3,233,170
Patented Feb. 1, 1966

3,233,170
MAGNETIC STUCK PIPE LOCATOR AND DETONATOR USING A SINGLE LINE TO TRANSMIT SIGNALS
Austin S. Rogers, Houston, Tex., assignor to Houston Oil Field Material Company, Inc., Houston, Tex., a corporation of Delaware
Filed Mar. 1, 1961, Ser. No. 92,536
3 Claims. (Cl. 324—34)

The present invention relates to improvements in methods of and apparatus for locating the point at which pipe is stuck in a well bore as well as determining physical conditions of pipe in a well bore and forces effecting such conditions.

There are at present two general types of methods and apparatus used for determining where pipe is stuck in a well bore. One of these broadly is a magnetic method and apparatus in which a magnetic field is linked to a portion of the wall of the pipe in the well bore, forces applied to the pipe, and the changes in the characteristics of the magnetic field are noted at the surface to give an indication of where the pipe is stuck in the well bore as well as other conditions of the pipe and forces in the well bore effecting such conditions. Such methods and apparatus are generally disclosed in the Bender Patents Nos. 2,686,039 and 2,814,019.

The second method generally includes releasably fixing movable parts of an electrical control means to spaced points of the pipe and causing movement of the pipe which moves the movable parts by which the stuck point is indicated. The second type is generally disclosed in the Martin Patents Nos. 2,530,309 and 2,530,308 and the Brooks Patent No. 2,550,964.

While both of the above types of methods and apparatus are presently in widespread use, such methods and apparatus require a relatively large movement of the pipe in the well bore in order to obtain an accurate reading as to the location of the stuck point of the pipe. Neither of these methods or apparatus has been satisfactory in determining the stuck point of drill collars because the drill collars are thick walled sections of pipe located at the lower end of the drilling string just above the bit and the force applied at the surface to the pipe does not provide sufficient movement in these thick walled collars to give a sufficient signal to determine the stuck point of the drill collars.

The patent to Dahle, No. 2,912,642 discloses the principle of obtaining a sensitive measurement of magnetic stresses within a ferromagnetic material by providing two magnetic circuits, one of the circuits producing a magnetic field which is coupled to the ferromagnetic material and the second magnetic circuit is placed in the magnetic field of the first magnetic circuit but at right angles to that field so that a change in the mechanical forces in the ferromagnetic material will change the magnetic circuits so that an error signal may be produced in the second circuit to indicate the mechanical stress on the material.

The present invention is directed to an improved magnetic method of and apparatus for locating the stuck point of pipe which requires relatively little movement of the pipe in order to give an accurate indication of the stuck point.

The present invention is directed to providing a first magnetic core which is magnetically coupled to a portion of the pipe in the well bore and an alternating magnetic field is generated about the core and caused to permeate the ferrous pipe. A pick up coil on a second magnetic core is interposed precisely at right angles to the first magnetic core and thus in the null position of the first magnetic field. Thus so long as the pipe under inspection remains static the output of the pick up coil is zero. However, when a torque or longitudinal stress is introduced to the pipe the resulting stress distorts the physical structure of the material causing the first magnetic field to disort and add to and subtract from the null condition of the pick up coil. Therefore a change in the null condition generates a voltage in the pick up coil which is proportional to the annular displacement of the pipe. This measurement can be used to determine the point at which the torque stress applied to a pipe in a well bore is stopped and thus determines the stuck point of the pipe. Also any other condition of the pipe that effects its magnetic characteristics will produce an error or detected signal as the two magnetic fields move along the pipe. Thus joints, holes, external tools and other magnetic anomalies can be located.

Having a suitable method and apparatus for detecting magnetic anomalies the means used must be practicable so that a single conductor or cable as presently used in the wire line service may be utilized to transmit the necessary signals. Since the stress or magnetic detector apparatus is a device operating on an alternating current signal it is obvious that the output of the pick up coil is also the same frequency. Therefore, since it is necessary to use a single conductor cable to excite the detector or exciting coils it is impractical to transmit pick up signals of the same frequency over the same conductor. Consequently, the pick up signals should be amplified, phase compared to determine the direction of the stress, and converted to a direct current, all downhole within the apparatus case, before being transmitted uphole over the same conductor as used to excite the detector coils.

Therefore, it is a general object of the present invention to provide an improved magnetic method of and apparatus for determining the stuck point of pipe in a well bore in which very little movement of the pipe is required in order to make an accurate determination of the stuck point.

Yet a further object of the present invention is the provision of a method of and an apparatus in which minute stress, strain or load of pipe in a well bore or other conditions affecting the magnetic characteristics of the pipe may readily and easily be noted and determined through the transmission of data through a single conductor from a testing circuit above the ground to the testing detector in the well bore.

Still a further object of the present invention is the provision of a method of and apparatus for determining the stuck point of pipe in a well bore in which a U-shaped magnetic core is magnetically coupled to successive portions of the pipe, an alternating current is passed through a coil on the U-shaped core, a pick up coil on a core is positioned in and at right angles to the magnetic field of the U-shaped magnetic core and picks up changes in the stress, strain or load as a force is applied to the pipe or locates changes in the magnetic characteristics of the pipe. The pick up signal is measured to determine the direction of the signal thereby determining the phase or direction of the stress applied to the pipe, the detected signal is converted into a direct current signal and returned through the single line conductor signal cable to a testing circuit above the ground for indicating the stress on the pipe or magnetic change in pipe and thus determining the location of the stuck point of the pipe or other magnetic characteristic changes.

A still further object of the present invention is the provision of such an apparatus with a detonating charge including a detonating circuit which is connected to the single signal line conductor and which detonates and severs the pipe upon receiving a signal of a predetermined voltage.

Other and further objects, features and advantages will be apparent from the following description of a presently preferred embodiment of the method and apparatus of the invention, taken in conjunction with the accompanying drawings, where like character references refer to like parts throughout the several views, which views illustrate a presently preferred apparatus of the invention which is useful in the method of the invention, and where FIGURE 1 is a diagrammatic elevational view illustrating the apparatus according to the present invention and including a circuit diagram of the surface equipment, FIGURE 2A is a fragmentary sectional elevational view illustrating the upper portion of the downhole magnetic sensing unit of the instrument illustrated in FIGURE 1, FIGURE 2B is a continuation of FIGURE 2A and illustrates the intermediate portion of the magnetic sensing unit, FIGURE 2C is a continuation of FIGURE 2B and illustrates the lower portion of the sensing unit, FIGURE 3 is a cross-sectional view of the magnetic detector taken along the lines 3—3 of FIGURE 2A, FIGURE 4 is a cross-sectional view taken along the line 4—4 of FIGURE 3, FIGURE 5 is an electrical diagrammatic view of the magnetic detector unit, and FIGURE 6 is an electrical diagrammatic view of the electrical circuit of the detector apparatus and is a continuation of FIGURE 5.

Referring now to the drawings, and particularly to FIGURE 1, the downhole instrument is generally indicated by the reference numeral 10 and generally includes a magnetic detector or sensing unit 12 which is held adjacent to the pipe and thus is magnetically coupled to the pipe by the orienting assemblies 14, which may be suitable bow springs, a phase detecting and signal conversion means 16, and a shot sub 17.

The surface electrical testing circuit 20 is generally shown in diagrammatic form in FIGURE 1. In the testing circuit 20, an alternating current source 22 is provided, preferably of a low frequency of from 10 to 100 cycles to magnetically couple the exciting coils and core to and thoroughly permeate the pipe, and is connected to an adjustable transformer 24 whereby the desired voltage is selected and applied to the line 26 and applied to the single line conductor circuit 28. A volt meter 30 and ammeter 32 is provided to show the exciting voltage and current.

The single line conductor 28 transmits the exciting power signal from the generator 22 downhole, and as best seen in FIGURE 5, is electrically connected to an exciting circuit, preferably two coils 30 and 32 connected in series aiding which are wound on a magnetic core, which will be more fully described hereinafter, thereby creating a magnetic circuit which is coupled to the pipe. A pick up coil 34 is mounted on a second magnetic core and mounted at right angles or a 90° angle to the magnetic field of the exciting coils 30 and 32 and thus is mounted in a null position and generates no voltage so long as the magnetic field caused by the exciting coils 30 and 32 is symmetrical. An electrical lead 36 is provided from the exciting coil circuit, leads 38 and 40 are provided from the pick up coil 34, and a lead 42 is connected directly to the single line conductor 28, all for purposes which will be more fully described hereinafter.

Referring now to FIGURES 2A, 3 and 4, the physical structure of the electrical diagram of FIGURE 5 may be seen. The magnetic detector assembly 12 generally includes a body 44 having suitable coupling means such as the threaded box 46 at one end and the threads 48 at the lower end. A suitable electrical terminal 50 is provided to which the single line conductor 28 (not shown) is connected. The lower end of the terminal 50 has a suitable terminal arrangement such as a nut and thread for connection to the electrical lead 42 and the electrical lead 60 to the exciting coils 30 and 32. As previously discussed a magnetic core member 52 is provided, preferably U-shaped and vertically positioned so as to have the pole faces 54 and 56 magnetically coupled to the pipe when the instrument 10 is lowered into the pipe. The exciting coils 30 and 32 are wound on each leg of the yoke of the core 52 and are interconnected by the wire lead 58 and connected by the lead 60 to the bottom of the electrical terminal 50 so as to receive an exciting voltage and create a magnetic circuit through the core 52. The pick up coil 34 is wound around a core 62 which is positioned at 90° to the plane of the core 52 and thus is in a null position. A nonmetallic casing 64, such as a glass laminated casing, is provided about the magnetic detector assembly 12 so as not to interfere with the magnetic circuits involved.

Normally, the output of the pick up coil 34 is zero. However, when the pipe which is coupled in the magnetic circuit of the core 52 is subjected to stress, strain or load or other conditions which affect its magnetic characteristics, the resulting stress or change in the physical or magnetic structure of the pipe causes the magnetic field to distort and add to or substract from the null conditions of the pick up coil 34 and its magnetic circuit. In that event a voltage is generated in the pick up coil whose signal is proportional in the case of a torsional stress to the angular displacement of the pipe and the phase or direction of the current in that coil is indicative of the direction of the angular displacement. Thus when the magnetic detector assembly 12 is held against a pipe and the coils 30 and 32 are provided with an alternating current a magnetic field is produced through the U-shaped core 52 and a portion of the pipe. If a torque is applied to the pipe and no signal is generated in the pick up coil 34 that means that the detector assembly 12 is below the stuck point of the pipe in the well bore as no torque is being applied at the point of measurement, but if a signal is generated, the assembly is above the stuck point. If the magnetic detector is moved up and down the inside of the pipe it can be used to find the location of collars, holes in the pipe, pipe pitting, parting of the pipe, external ferromagnetic tools about the pipe or any other condition or force which affects the magnetic characteristics of the pipe. Thus a pipe collar would cause a magnetic disturbance as the magnetic circuit is moved across the collar and the collar becomes magnetically coupled to one of the poles of the core 52 and then the other. And any magnetic anomalies which would not present a symmetrical magnetic circuit to the poles 54 and 56 would affect the magnetic circuit of the core 52 even if the core 52 is at rest and would provide a pick up signal in the coil 34. For instance, the material mass in collars is not symmetrical and thus would not present a symmetrical magnetic circuit to the poles 54 and 56. Therefore an off null condition would exist in the coil 34 even when the magnetic circuit of the core 52 is at rest and coupled to the collar. Thus the apparatus can be for detection of objects or conditions while at rest as well as when moving.

A slip ring connector 66 is provided in the lower end of the magnetic detector sub assembly 12 and includes slip rings 68, 70, 72 and 74. The electrical leads 38 and 40 from the pick up coil 34 are electrically connected to the slip rings 74 and 72, respectively. The electrical lead 42 which is connected through connector 50 directly to the single line conductor circuit 28 is directly connected to slip ring 70. The electrical lead 36 from the exciting coils 30 and 32 is connected to the slip ring 68. The interior of the stress detector assembly is suitably filled with a sealing material.

The detected signal from the pick up coil 34, as best seen in FIGURE 5, is transmitted to the electrical leads 38 and 40. However, this signal is an alternating current of the same frequency as the exciting frequency applied to coils 30 and 32 and it is thus impractical to transmit the detector signal of the same frequency over the same conductor 28 on which the exciting signal is transmitted. Therefore, the detected signal must be converted to a signal which can be transmitted over the single line conductor 28 as it is not practicable in deep well bore operations to utilize a multiple cable because of the size and difficulty of transporting and utilizing a drum and cable of the size that would be required.

Therefore, referring to FIGURE 6, the electrical conversion of the detected signal from the pick up coil 34 can best be seen. The pick up signal is passed through a slip ring box, which will be more fully described, and the leads 38 and 40 are connected to a transformer 76 whose impedance matches the impedance of the pick up coil 34. Transformer 76 also steps up the current and passes the detected alternating current signal to a phase detector circuit 78. A transformer 80 is connected to the electrical lead 42 through A.C. bypass capacitor 83 and thus receives the exciting voltage transmitted through the single line conductor 28. A diode or other suitable current rectifying means 82 is placed in the secondary of the transformer 80 and thus applies a pulsating D.C. current across the resistors 84 and 86 and thus to both collectors of the transistors 88 and 90. As previously noted, the direction of the signal in the pick up coil 34 and thus in the leads 38 and 40 will depend upon the direction of the torque applied to the pipe. Resistors 160 and 162 are the load resistors. Resistor 164 is a current limiting resistor. Thus assuming that the current is flowing from the coil 34 so as to pass from electrical lead 38 through the transformer 76 and then to the electrical lead 40, a current will be induced in the phase detector circuit 78 which will block the conduction of the transistor 90 and will cause the transistor 88 to conduct. Thus a pulsating D.C. current will appear across the terminals 92 and 94 and its direction will be indicative of the direction of the torque applied to the pipe. This pulsating current is then passed through the demodulator filter 96 and 98 thereby presenting a D.C. signal at the point 100 which is connected to the electrical lead 36 so that the electrical signal can be transmitted on the single line conductor 28 back to the testing circuit at the surface. Furthermore the direction of this direct current to the surface will indicate the direction of the torque applied to the pipe. Capacitors 93 and 95 are A.C. bypass capacitors.

After the stuck point of a pipe has been determined, it is desirable to detonate an electrical charge slightly above the stuck point so as to retrieve as much of the string of pipe as possible. The subsurface circuit as shown in FIGURE 6 provides a detonating circuit which can be used to detonate the charge through the use of a predetermined D.C. voltage signal through the single line conductor 28 to the electrical leads 36 and 42. In that case a negative D.C. current is applied at the surface, as will be more fully described hereinafter, creating a D.C. voltage from the electrical lead 36 through the point 100 through relay filter 97, through the resistor 102, through relay 108 of the relay circuit 109 and through the electrical blocking valves 104 and 106 to ground. It is noted that blocking valve 104 normally prevents the passage of the detonating current through this circuit which would actuate the relay 108. Blocking valve 104 thereby prevents actuation of the detonating circuit by the D.C. detected signal from point 100. However, blocking valve 104 is selected to break down and pass a voltage of a predetermined value, such as five volts which would be greater than the D.C. detected signal from coil 34, and thus allows passage of D.C. detonating current through the relay 108 to close the contact 110. When the contact 110 is closed the holding coil 112 is energized and the direct detonating current then passes directly from the electrical lead 42 through the contact 110 and to line 113 to the detonator 114 to actuate a conventional detonating charge. Thus, the stuck point in the pipe may be located, and severed above the stuck point in a one trip down the hole and all of the control signals may utilize the single line conductor 28.

Referring again to FIGURE 1, the testing circuit 20 includes the indicating circuit 114 and the detonating actuation circuit 116. The D.C. signal which indicates the change in stress or magnetic characteristic of the pipe is transmitted up hole through the single line conductor 28 to the indicator circuit 114 through the lead 118. Batteries 120 and 122 along with potentiometer 124 provides the zero adjustment in the indicator circuit. An indicating meter 126 is provided to indicate the amount and the direction of the stress detected by the pick up coil 34.

The detonating or firing circuit 116 includes a power switch 128 which when closed applies power from the generator 22 to a transformer 130 and provides a D.C. power source by the rectifier bridge 132. A firing switch 134 is provided which is normally in the position against contact 136 to transmit the exciting potential and the D.C. indicating signal over the single line conductor 28. However, after the stuck point has been located and the detonator shot bar 18 positioned as desired, the firing switch 134 is switched to contact 138 and the D.C. power switch 128 is actuated thereby sending a D.C. signal of a predetermined amount of voltage down hole through the conductor 28 to the detonating circuit.

Referring now to FIGURES 2B and 2C, the physical structure of the electrical schematic disclosed in FIGURE 6 is best seen. A signal conversion assembly 16 is provided which is adapted to be suitably connected to the magnetic detection assembly 12 by means of a threaded box connection 140 onto the threads 48. When the assembly 16 is so connected to the slip ring box 142 engages the slip ring connector 66 to provide electrical contacts between the slip ring contacts 68, 70, 72 and 74 with contacts 68′, 70′, 72′ and 74′, respectively. The various electrical components are shown in FIGURES 2B and 2C provided with the numbers corresponding to the numbers provided in FIGURE 6. However, no detail is shown of the safety sub 15 the shot sub 17, the shot bar 18 (FIGURE 1) as these are conventional items and no further description is believed necessary.

In use, the detector unit 10 is assembled as illustrated in FIGURE 1 by connecting the apparatus to the testing circuit 20 by a suitable cable head 150 and providing sinker bars 152 to provide sufficient weight to lower the instrument. If the instrument is to be used to detect the stuck point of a pipe the instrument 10 is lowered in the pipe (not shown) in a well bore and, preferably, is lowered to the bottom of the string of pipe. It is noted that the holding assemblies 14, which in this case are shown as bow strings, press against the inside of the pipe and hold the stress detector assembly 12 against the inside of the pipe. Thus as best seen in FIGURES 2A and 3 the pole faces 54 and 56 of the U-shaped magnetic core 52 are in close proximity to the pipe and are magnetically coupled with the pipe through the non-metallic shell 64. The electrical generator 22 creates an alternating current power which is taken off the voltage divider 24, passed through the line 26 and down through the firing switch which is now on contact 136 and into the single line conductor 28 thereby providing an exciting voltage to the exciting coils 30 and 32. Thus, a magnetic primary circuit is set up through the core 52 and that portion of the pipe which is adjacent and magnetically linked to that magnetic circuit. A torque is then applied at the surface to the pipe which places the pipe under a stress from the surface down to the stuck point. If the magnetic core 52 is below the stuck point there will be no stress applied to the pipe or drill collars at that point and the magnetic circuit of the core 52 will not be distored and therefore there will be no signal in the pick up coil 34. Thus, successive readings can be taken along the length of the pipe by raising the apparatus 10 and torquing the pipe and taking readings at various points. If the magnetic circuit of the core 52 is positioned to couple the pipe above the stuck point the stressed pipe will distort the physical structure of the coupled portion of the pipe thereby causing the magnetic field to distort and thus add to or subtract from the null conditions of the magnetic field of the pick up coil 34. Therefore, a voltage would be generated in the pick up coil which would be transmitted to the phase detector circuit 78 (FIGURE 6) and an alternating current signal would be converted into a pulsating D.C. current signal, the direction of which would depend upon the direction of the torque applied to the pipe. The D.C. pulsating detected signal would then pass through a filter to smooth out and provide a steady D.C. detector signal at point 100 which would be transmitted through the lead 36 back up the single line conductor 28 and to the indicating circuit 114 where the indicating meter 126 would indicate both the direction of the applied torque and its magnitude thereby providing an indication of the stuck point.

It is advantageous to know at different locations along the well bore whether the pipe is actually being torqued or turned and the amount of such turning. Whether a pipe is torqued a certain amount downhole by a certain amount of torque placed on the pipe at the surface will disclose important information about the well conditions that the pipe is encountering. For instance, the amount of torque that is detected downhole in the pipe will give an indication of how much the pipe is stuck. Also if the pipe becomes freed from the stuck point while working the pipe, it will turn to relieve the torque in the pipe and this turning can be detected so that the back off shot is not needed and all of the pipe instead of just a portion can be recovered.

After the stuck point has been determined apparatus 10 is moved in the pipe to locate the shot bar 18 (FIGURE 1) slightly above the stuck point in order to detonate a charge to recover as much of the pipe as possible if such a procedure is desired. When the apparatus 10 is in position, the firing switch 134 and the power switch 128 in the D.C. detonating circuit 116 is actuated thereby applying a negative D.C. current to the single line conductor 28 which is transmitted downhole to the lead 36 (FIGURE 6) where that D.C. firing charge is of such a voltage to break down the current limiting device 104 and cause a current to flow through the relay 108 thereby actuating the contact 110. After the contact 110 is actuated the D.C. firing charge is passed from the single line conductor 28 to the electrical lead 42 (FIGURES 5 and 6) to the holding relay 112 and directly to the actuating detonator 114 to fire a conventional charge.

The device of the present invention can also be used to locate tool joints, cross-sectional changes in the pipe, defects and other magnetic abnormalities in the pipe which would distort the magnetic field of the core 52. Thus while the apparatus 10 is being moved in the pipe these abnormalities encounter one of the pole faces of the magnetic core 52 thus distorting that magnetic field causing a reading in the pick up coil.

It is believed that the method of the invention is apparent from the foregoing description of the presently preferred apparatus of the invention. The method, however, comprises the steps of magnetically coupling a first magnetic core to successive portions of a pipe, placing a second magnetic circuit at right angles to the first magnetic circuit, applying a torque to the pipe, passing any detecting signal from the second magnetic circuit to a phase detecting circuit to determine the direction of the torque, converting the detected signal into a D.C. signal, and passing the D.C. signal to the surface. The method also includes the steps of providing an exciting signal to the first magnetic circuit through a single line conductor and transmitting the converted signal uphole on the same single line conductor. The method further comprehends the passage downwardly on the same single line conductor of a D.C. detonating signal of a predetermined voltage to a detonating circuit for separating the pipe above the stuck point.

The method also can be used to locate tool joints, cross-sectional changes in the pipe and other anomalies in the pipe which would distort a magnetic field passing through the pipe. That method includes the steps of placing a first magnetic core and coil in a pipe, placing a second magnetic core and coil at right angles to said first core, exciting the first magnetic core and coil, moving the magnetic cores along the pipe, converting the detected signal from the second core downhole to a direct current signal, and transmitting the direct current signal to the surface.

The present invention therefore is well suited and adapted to obtain the objects and ends and has the advantages mentioned as well as others inherent therein.

In both the method and apparatus of the present invention, while presently preferred examples of the invention have been given for the purpose of disclosure, many changes in the details of structure and arrangement of parts may be made in the apparatus of the invention and many changes in instrumentalities may be used in the method of the invention which are within the scope of the invention and the scope of the appended claims.

What is claimed is:

1. An apparatus for determining the point at which pipe is stuck in a well bore comprising,
   an elongated nonferrous support adapted to be lowered into said pipe;
   a U-shaped magnetic core carried by the support in position so as to be magnetically coupled to the pipe;
   means connected to the support for holding said core adjacent to and magnetically coupled to the pipe;
   a second magnetic core carried by said support and positioned in the magnetic field of the U-shaped core, said second core positioned at right angles to the U-shaped core;
   an exciting coil, one side of which is connected to ground surrounding said U-shaped core;
   a pickup coil surrounding said second magnetic core;
   a testing circuit positioned above ground including an A.C. generating signal circuit and a D.C. indicating circuit;
   a single electrical line connected between the testing circuit and the other side of said exciting coil;
   a phase detecting circuit carried by said support and electrically connected to the pickup coil for determining the magnitude and the direction of the detected current in the pickup coil thereby indicating the direction and amount of torque applied to the pipe; and
   converting means connected to the phase detector converting the detected alternating current signal from the pickup coil into a direct current signal, said converting means being electrically connected to the single line circuit thereby transmitting a direct current detection signal to the testing circuit.

2. The invention of claim 1 including a detonating means including a detonating circuit carried by said support, said detonating circuit being connected to the single line conductor and comprising,
   switching means in said detonating circuit adapted to actuate the detonating means on a predetermined voltage signal.

3. An apparatus for determining the point at which pipe is stuck in a well bore comprising; an elongate non-ferrous support adapted to be lowered in said pipe; a U-shaped magnetic core carried by the support and positioned so as to be magnetically coupled to the pipe, spring means connected to said support on either side of said U-shaped magnetic core yieldably holding said U-shaped magnetic core adjacent said pipe; a second magnetic core carried by said support and positioned in the magnetic field of the U-shaped core; said second core positioned at right angles to the U-shaped core; two exciting coils connected in series aiding surrounding said U-shaped core; a pick up coil surrounding said second magnetic core; a testing circuit positioned above ground including an A.C. generating signal circuit, and a D.C. indicating circuit and a D.C. detonating signal circuit; a single electrical line connected to all of said circuits and to said exciting coils; said exciting coils being connected to ground; a phase detecting circuit carried by said support and electrically connected to the pick up coil; converting means connected to the phase detector converting alternating current signals from the pick up coil into direct current signals; said converting means being electrically connected to the single line circuit thereby transmitting a direct current detected signal to the testing circuit, detonating means including a detonating circuit carried by said support, said detonating circuit electrically connected to the single line conductor, and actuating means in said detonating circuit actuating the circuit on a predetermined voltage signal.

References Cited by the Examiner

UNITED STATES PATENTS

| | | | |
|---|---|---|---|
| 2,703,053 | 3/1955 | Castel | 317—80 X |
| 2,732,518 | 1/1956 | Bricaud | 324—34 X |
| 2,770,773 | 11/1956 | Cooley | 324—37 |
| 2,790,140 | 4/1957 | Bender | 324—37 |
| 2,817,808 | 12/1957 | Gieske | 324—34 |
| 2,871,784 | 2/1959 | Blair | 102—21 |
| 2,912,642 | 11/1959 | Dahle | 324—34 |
| 2,961,602 | 11/1960 | Bender | 324—34 |
| 3,020,469 | 2/1962 | O'Reilly | 324—34 |
| 3,020,473 | 2/1962 | Cauley | 324—34 |
| 3,088,068 | 4/1963 | Hall | 324—34 |

WALTER L. CARLSON, *Primary Examiner.*

LLOYD McCOLLUM, *Examiner.*